US010600055B2

(12) United States Patent
Durney et al.

(10) Patent No.: US 10,600,055 B2
(45) Date of Patent: *Mar. 24, 2020

(54) AUTHENTICATION AND INTERACTION TRACKING SYSTEM AND METHOD

(71) Applicant: JPMorgan Chase Bank, N.A., New York, NY (US)

(72) Inventors: Stephen Durney, Gilbert, AZ (US); Tracy M. Pletz, Wilmington, DE (US); Timothy A. Webb, Elkton, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/672,598

(22) Filed: Aug. 9, 2017

(65) Prior Publication Data

US 2017/0337557 A1 Nov. 23, 2017

Related U.S. Application Data

(63) Continuation of application No. 14/967,496, filed on Dec. 14, 2015, now Pat. No. 9,734,501, which is a (Continued)

(51) Int. Cl.
*H04L 29/06* (2006.01)
*G06Q 20/40* (2012.01)
*G06F 21/62* (2013.01)

(52) U.S. Cl.
CPC ..... *G06Q 20/4016* (2013.01); *G06Q 20/4014* (2013.01); *H04L 29/06* (2013.01);
(Continued)

(58) Field of Classification Search
CPC ...... H04L 29/06; H04L 63/08; G06F 21/6245
See application file for complete search history.

(56) References Cited

U.S. PATENT DOCUMENTS

| 4,761,807 A | 8/1988 | Matthews et al. |
| 4,795,890 A | 1/1989 | Goldman |

(Continued)

FOREIGN PATENT DOCUMENTS

WO WO-2011014875 A1 2/2011

*Primary Examiner* — Dao Q Ho
(74) *Attorney, Agent, or Firm* — Greenblum & Bernstein, P.L.C.

(57) ABSTRACT

Aspects of the invention relate to a central authentication and interaction tracking system for authenticating an entity making a request related to a financial account. The system facilitates authentication of an entity engaging in an interaction with a financial institution, the authentication based on a record of interactions initiated by the entity. The system includes an application interface receiving interaction requests over a network, the interaction requests originating from multiple entities and including a plurality of authentication factors. The system further includes a computer processor and computer memory capable of building, from each interaction request, an entity print record for each of the multiple entities, wherein each entity print record includes indicators of the authentication factors from each initiated transaction request. The system further facilitates deriving, from the entity print record, an entity print and storing the entity print in at least one computer memory, comparing received authentication factors for a requested interaction with the entity print, and making an authentication determination based on the comparison.

23 Claims, 10 Drawing Sheets

Related U.S. Application Data continuation of application No. 14/224,400, filed on Mar. 25, 2014, now Pat. No. 9,246,899, which is a continuation-in-part of application No. 13/567,153, filed on Aug. 6, 2012, now Pat. No. 8,826,371, which is a continuation of application No. 12/041,033, filed on Mar. 3, 2008, now Pat. No. 8,255,971.

(52) U.S. Cl.
CPC .......... *H04L 63/08* (2013.01); *G06F 21/6245* (2013.01); *H04L 29/06027* (2013.01)

(56) References Cited

U.S. PATENT DOCUMENTS

| | | |
|---|---|---|
| 5,599,231 A | 2/1997 | Hibino et al. |
| 5,754,657 A | 5/1998 | Schipper et al. |
| 5,765,197 A | 6/1998 | Combs |
| 5,838,790 A | 11/1998 | McAuliffe et al. |
| 5,839,063 A | 11/1998 | Lee |
| 5,953,399 A | 9/1999 | Farris et al. |
| 6,012,045 A | 1/2000 | Barzilai et al. |
| 6,219,793 B1 | 4/2001 | Li et al. |
| 6,230,271 B1 | 5/2001 | Wadlow et al. |
| 6,246,767 B1 | 6/2001 | Akins, III et al. |
| 6,256,737 B1 | 7/2001 | Bianco et al. |
| 6,275,859 B1 | 8/2001 | Wesley et al. |
| 6,453,301 B1 | 9/2002 | Niwa |
| 6,510,513 B1 | 1/2003 | Daniell |
| 6,526,508 B2 | 2/2003 | Akins, III et al. |
| 6,580,906 B2 | 6/2003 | Bilgic et al. |
| 6,772,336 B1 | 8/2004 | Dixon, Jr. |
| 6,899,269 B1 | 5/2005 | Deland |
| 6,912,582 B2 | 6/2005 | Guo et al. |
| 6,920,561 B1 | 7/2005 | Gould et al. |
| 7,004,382 B2 | 2/2006 | Sandru |
| 7,058,817 B1 | 6/2006 | Ellmore |
| 7,233,664 B2 | 6/2007 | Soliman |
| 7,251,624 B1 | 7/2007 | Lee et al. |
| 7,260,836 B2 | 8/2007 | Roskind et al. |
| 7,263,506 B2 | 8/2007 | Lee et al. |
| 7,317,823 B1 | 1/2008 | Price et al. |
| 7,322,041 B2 | 1/2008 | Bligic et al. |
| 7,336,773 B2 | 2/2008 | Mittal |
| 7,350,076 B1 | 3/2008 | Young et al. |
| 7,356,837 B2 | 4/2008 | Asghari-Kamrani et al. |
| 7,360,239 B2 | 4/2008 | Mandalia et al. |
| 7,362,862 B2 | 4/2008 | Schneier et al. |
| 7,440,915 B1 | 10/2008 | Ulrich |
| 7,499,888 B1 | 3/2009 | Tu et al. |
| 7,636,941 B2 | 12/2009 | Blinn et al. |
| 7,652,991 B2 | 1/2010 | Ge et al. |
| 7,679,486 B2 | 3/2010 | Okada |
| 7,693,313 B2 | 4/2010 | Ehlers et al. |
| 7,694,130 B1 | 4/2010 | Martinez |
| 7,840,045 B2 | 11/2010 | Guo et al. |
| 7,844,551 B1 | 11/2010 | Bottner et al. |
| 7,844,832 B2 | 11/2010 | Nation et al. |
| 7,853,985 B2 | 12/2010 | Deininger et al. |
| 7,904,360 B2 | 3/2011 | Evans |
| 8,396,808 B2 | 3/2013 | Greenspan |
| 2002/0113995 A1 | 8/2002 | Evans et al. |
| 2003/0014368 A1 | 1/2003 | Leurig et al. |
| 2003/0236847 A1 | 12/2003 | Benowitz et al. |
| 2006/0149501 A1 | 7/2006 | Tsalakopoulos |
| 2007/0143851 A1 | 6/2007 | Nicodemus et al. |
| 2007/0220614 A1* | 9/2007 | Ellis .................. G06F 21/6245 726/27 |
| 2008/0133531 A1 | 6/2008 | Baskerville et al. |
| 2008/0140514 A1 | 6/2008 | Stenger |
| 2009/0089869 A1 | 4/2009 | Varghese |
| 2012/0089461 A1 | 4/2012 | Greenspan |

\* cited by examiner

AUTHENTICATION AND INTERACTION TRACKING SYSTEM AND METHOD

CROSS-REFERENCE TO RELATED APPLICATIONS

This patent application is a continuation of U.S. patent application Ser. No. 14/967,496 filed on Dec. 14, 2015 and will issue as U.S. Pat. No. 9,734,501 on Aug. 15, 2017, which is a continuation of U.S. patent application Ser. No. 14/224,400 filed on Mar. 25, 2014 and issued as U.S. Pat. No. 9,246,899 on Jan. 26, 2016, which is a continuation-in-part of U.S. patent application Ser. No. 13/567,153 filed on Aug. 6, 2012 and issued as U.S. Pat. No. 8,826,371 on Sep. 2, 2014, which is a continuation of Ser. No. 12/041,033 filed on Mar. 3, 2008 and issued as U.S. Pat. No. 8,255,971 on Aug. 28, 2012, all of which are hereby incorporated by reference in their entirety.

TECHNICAL FIELD

Embodiments of the invention are related generally to systems and methods for authenticating an entity attempting to access a financial account or account services, and, more particular to a system and method for authenticating an entity in a consistent and appropriate manner through multiple access channels.

BACKGROUND OF THE INVENTION

Customer authentication for credit card, debit card, and banking users is a critical function that has yielded sub-optimal results. Customer authentication is generally initiated when a customer acquires an account or attempts to use or service the acquired account through one or more of a number of channels. Today, the process of customer authentication is often inconsistently supported across channels such as Internet, phone, bank branches, and ATMs. Currently, financial institutions embed authentication policy within each internal application and the applications accessed may vary depending on the channel through which interaction occurs.

The above-identified parent application proposes a solution to enable customers to experience consistent authentication processes when attempting a variety of actions, such as new account screening, transaction authentication, and servicing authentication, through one of a number of channels. Such channels may include, for example, telephone, face-to-face, and web channels. Multiple applications may include a VRU application, a Branch application, and web applications. A centrally managed authentication and interaction tracking platform is provided, enabling customers to experience consistent treatment when entering the system through any given channel. Using the central authentication and interaction tracking system, an ability is created to quickly adapt to new threats and emerging technologies. The proposed authentication model is additionally capable of leveraging cross-channel transactions or behavioral risk so as to apply authentication policy based on a level of risk associated with the channel and transaction type. Furthermore, the proposed system adds a risk assessment component to identify certain acts as involving more risk than others.

Another difficulty with the existing systems is that they fail to combat increasingly sophisticated fraud techniques. Perpetrators of fraud strive to find the point of least resistance and continue to access the system through that point. Often, transactions are authenticated based on multiple customer authentication factors. Typically these factors include: (1) something the customer knows; (2) something the customer is; and (3) something the custom er has. With respect to the first factor, something the customer knows may include such things as a username, password, and security questions. These factors can be easily compromised and are increasingly at risk for being used to perpetrate fraud. Fraudulent actors have an increasing number of information sources available such as email accounts and social media accounts, from which to acquire personal information. What the customer "knows" has historically been one of the weakest security measures against fraud. With regard to the second category of factors, what the customer "is" may take the form of an IP address or caller ID. However, even with this second category of authentication factor, computers and mobile phones are frequently targets of theft and can be accessed and used by fraudulent actors. With the third category of information, things that the customer has may include RSID tokens or payment cards. These identifiers can also be easily stolen. Biometric indicators such as fingerprints and retinal prints also fall into this category and may generally be more reliable indicators but are not currently frequently used.

Existing financial processing systems often rely on one or two of the above-identified easy-to-compromise methods to authenticate transactions. Even two-step authentication methods that rely upon dynamic token passwords have been more frequently compromised. Detection of fraudulent transactions has also been a challenge because data used for authentication may change over time. Customers may forget passwords, lose credit cards, or change phones, for example. The failure of one or more authentication attempts is not necessarily, in itself, an indication of fraud.

A fourth category of information includes "something you do". This relates to a pattern of activity. For example, certain entities may frequently use an ATM machine, make purchases online, or dine at a specific restaurant. The entities may perform these actions on particular dates, weeks, or months, at fairly regular times. This category is less frequently used for authentication purposes.

Thus, the security policies of authentication systems typically do not take into consideration activities and historical actions across all channels and applications. Historical actions can be indicative of valid future actions as well as of fraudulent future actions. Additionally, levels of risks may be associated not only with actions, but also with particular entities. Existing systems often fail to take this fact into account during authentication processing.

Additionally, while it has been suggested that a transaction risk level may be considered, existing systems do not take into consideration a risk level of the entity instigating the transaction, interaction, or event. While many entities interacting with financial institutions are customers, other entities may include employees, third party providers, or unrelated individuals. Historical interactive patterns of entities can be indicative of their risk level.

Thus, a solution is needed that takes into account historical patterns and deviations from historical patterns. The system should account for both entity risk and transaction risk during authentication. The solution should be centrally managed and executed in order to support appropriate, specific, and consistent strategies across all channels and applications.

BRIEF SUMMARY OF THE INVENTION

In one aspect of the invention, a method for facilitating authentication of an entity engaging in an event with a financial institution is provided. The authentication is based on a record of events or interactions initiated by the entity. The method includes receiving event requests over a network at a central authentication and interaction tracking system, the central authentication and interaction tracking system including at least one computer memory and at least one computer processor, the event requests originating from multiple entities and including a plurality of authentication factors. The method includes executing instructions stored in the computer memory using the computer processor to perform multiple steps. The steps include building, from each event request, an entity print record for each of the multiple entities, wherein each entity print record includes indicators of the authentication factors from each initiated event request. The method further includes deriving, from the entity print record, an entity print and storing the entity print in at least one computer memory. The method additionally includes comparing received authentication factors for a requested event with the entity print and making an authentication determination based on the comparison. The entity print comparison may also include comparison of the received authentication factors with both an individualized entity print and a standardized reference print using electronic triangulation.

In another aspect of the invention, an authentication and interaction tracking system is provided for facilitating authentication of an entity engaging in an interaction with a financial institution, the authentication based on a record of interactions initiated by the entity. The central authentication and interaction tracking system includes an application interface receiving interaction requests over a network, the interaction requests originating from multiple entities and including a plurality of authentication factors. The central authentication and interaction tracking system further includes at least one computer memory storing information from the interaction requests and instructions for processing the information and at least one computer processor accessing the computer memory and executing the instructions stored in the computer memory using the computer processor to perform multiple steps. The steps include building, from each interaction request, an entity print record for each of the multiple entities, wherein each entity print record includes indicators of the authentication factors from each initiated interaction request. The steps additionally include deriving, from the entity print record, an entity print and storing the entity print in at least one computer memory and comparing received authentication factors for a requested interaction with the entity print. The steps additionally include making an authentication determination based on the comparison.

In yet an additional aspect of the invention, the entity print system provides an indicator of the likelihood that the requestor identity matches the entity and an indicator of the entity's risk level. Furthermore, an interaction signature system provides an indicator of the likelihood that the requested interaction is fraudulent based on multiple characteristics of the interaction.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a centralized, risk-based authentication and interaction tracking system capable of interfacing with multiple users over multiple diverse channels as well as multiple diverse applications. The authentication and interaction tracking system may consider a type of user request, a user profile, an account type, the type of access channel, and other factors in determining appropriate authentication criteria for authentication of the user. The authentication may provide a single point of entry for in-bound and out-bound customer authentications in an environment in which policy can be changed, tested, versioned, and deployed by the business in response to changes in strategy or tactics. Furthermore, the system may develop an entity print based on historical behavior of the entity and use the entity print for authentication purposes.

Figure 1:
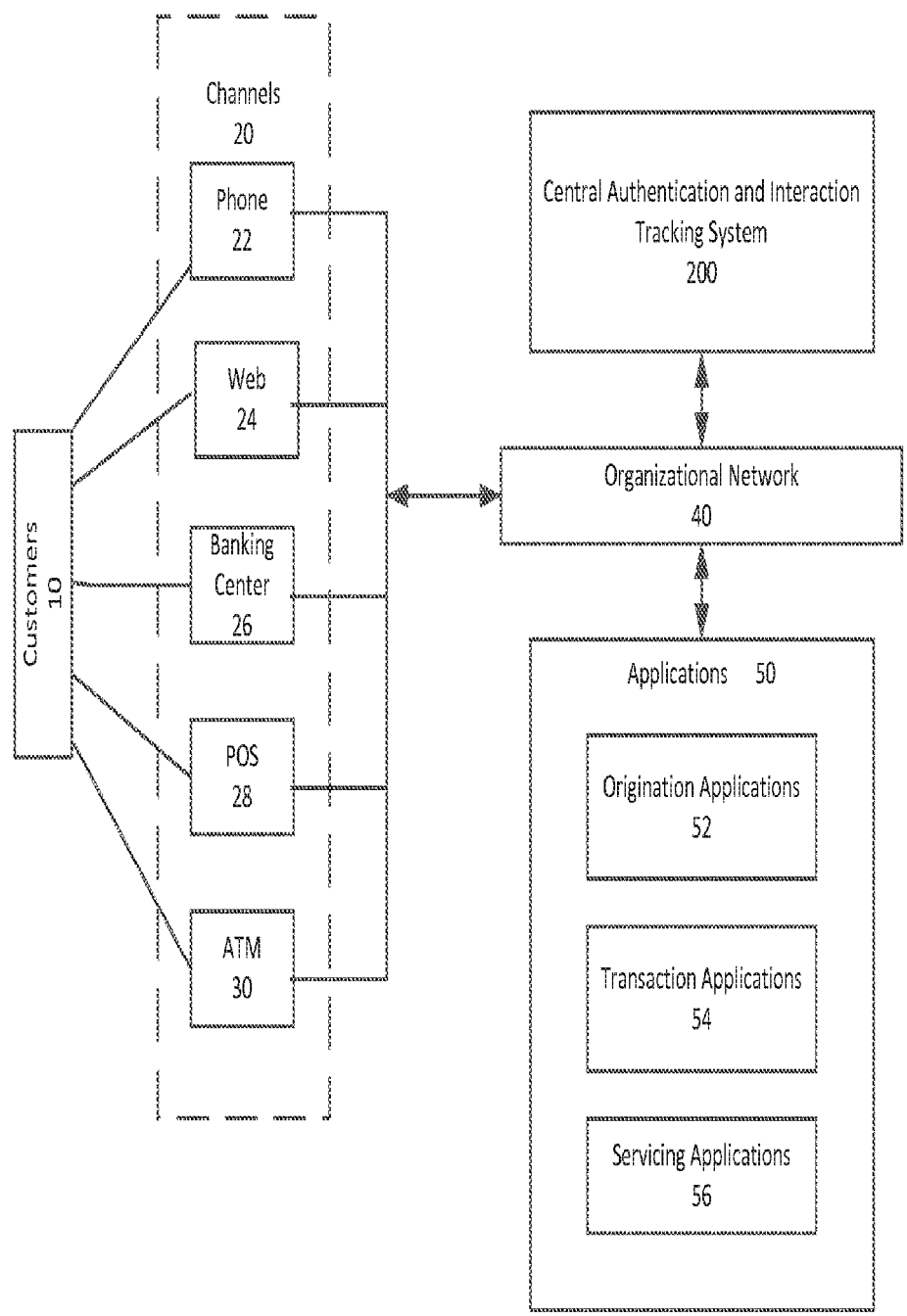
FIG. 1 is a block diagram illustrating an operating environment for a customer authentication and interaction tracking system in accordance with an embodiment of the invention.

FIG. 1 is a block diagram illustrating an operating environment for a customer authentication and interaction tracking system in accordance with an embodiment of the invention. Customers (or users or other entities) 10 connect through channels 20 to an organizational network 40. Over the organizational network 40, customer requests are processed through interaction with a central authentication and interaction tracking system 200 and applications 50.

The channels 20 are represented in FIG. 1 by telephone 22, web 24, banking center 26, point of sale (POS) terminal 28, and ATM machine 30. However, these particular channels are merely exemplary and any access point through which a customer can communicate with an organization may qualify as a channel. Typically, a large number of customer access points will be provided for both in-bound and out-bound interactions.

Applications 50 may include origination applications 52, transaction applications 54, and servicing applications 56. Origination applications 52 may serve the customers 10 by establishing accounts or account features. Transaction applications 54 may be accessed by customers 10 in order to execute a financial transaction, such a deposit, withdrawal, or transfer of funds. Servicing applications 56 may be accessed by customers 10 in order to perform various account-related actions, such as changing a customer address or phone number or answering questions about a customer account statement. As defined herein, any task requested by an entity, through any of the aforementioned application, is considered to be an "interaction" or an "event".

Some channels 20 may allow interaction with all three of these types of applications. Other channels 20 may limit interaction to only one or two selected types of applications. For example, the POS terminal 28 may allow connection with only transaction applications 54. The banking center 26 may allow use of origination applications 52, transaction applications 54, and servicing applications 56.

The central authentication and interaction tracking system 200, which will be further described in FIG. 2 below may operate in conjunction with all of the illustrated channels and applications as a single entry point to apply risk-based policy rules for user authentication.

Although the applications 50 interact with the authentication and interaction tracking system 200, the applications also may interface with or may be integrated with application level authentication tools. Such application level authentication tools may include for example, a voice recognition unit in combination with a voice confidence level indicator, fingerprint recognition tools, iris pattern recognition tools, hand print recognition tools, spoken response recognition tools, tone recognition tools, pressure recognition tools, temperature, heartbeat sensors, or other biometric authentication tools. Other application level authentication tools may include PIN and password recognition components, IP address recognition components, email address verification components, ANI, SIM card recognition, and other similar tools.

Figure 2:
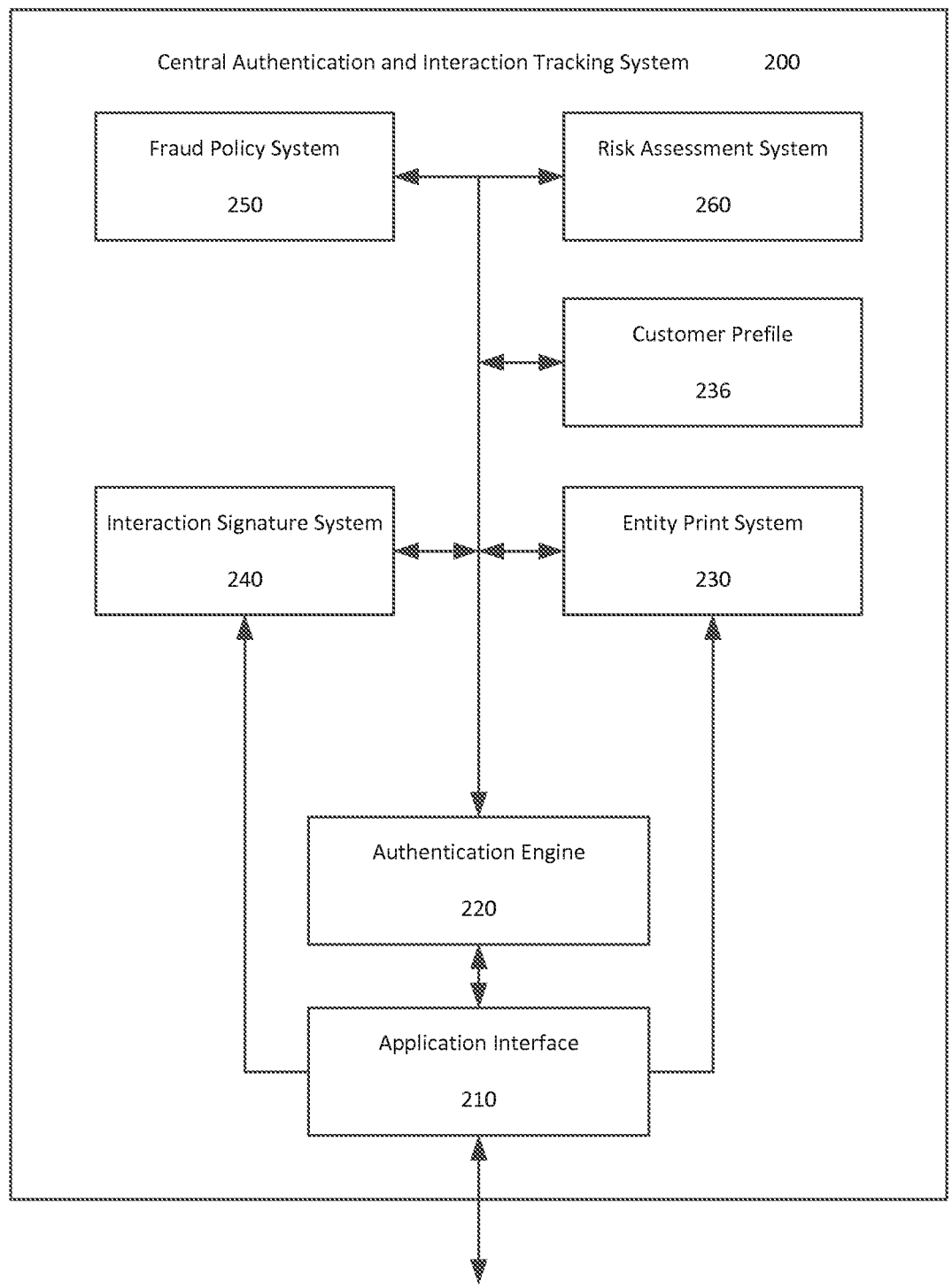
FIG. 2 is a block diagram illustrating a central authentication and interaction tracking system in accordance with an embodiment of the invention.

FIG. 2 is a block diagram illustrating a central authentication and interaction tracking system 200 in accordance with an embodiment of the invention. As illustrated, the central authentication and interaction tracking system 200 may include an application interface 210 that receives information from various applications. The application interface 210 may pass the information to an authentication engine 220, an entity print system 230, a customer profile 236, and interaction signature system 240. These components may interact with a fraud policy system 250 and a risk assessment system 260. The fraud policy system 250 and the risk assessment system 260 may be integral with the central authentication and interaction tracking system 200 as shown or alternatively may be separate systems as shown in the disclosure of parent application Ser. No. 12/041,033, which is incorporated herein by reference. The central authentication and interaction tracking system 200 may also interact with a card system of record (SOR) as illustrated in the parent application.

The authentication and interaction tracking system 200 interacts with customers through the application interface 210 with the multiple applications 50 as shown in FIG. 1. The application interface 210 is an entry point through the applications 50, regardless of the access channel. Each application 50 contacts the central authentication and interaction tracking system 200 through the application interface 210 to initiate an authentication dialog. The authentication engine 220 may then determine customer risk based on information provided by the risk assessment system 260 and select the appropriate policy based on communication with the fraud policy system 250. Policy selection may be dependent on the channel, application, transaction risk pattern, customer request, customer or account attributes, entity print, and/or interaction signature.

The entity print system 230 may serve to develop an entity print for each entity instigating an interaction with the financial institution. Entities may include customers, but may also include third party providers, employees, prospective customers, former customers, and other individuals who have no historical relationship with the financial institution. The developed entity print is developed based on all historical transaction information available for transactions between the entity and the authentication and interaction tracking system. In embodiments of the invention, the entity print may have two components including an identity component and a risk component. The identity component may provide an indicator to be used for comparison to authenticate the entity or to verify that the entity is the entity it alleges to be. The risk component may provide a level of risk associated with the entity based on its transaction history. These components may comprise two distinct axes of the entity print.

An entity may make a request from a specific device in a specific location. For example, the device may be a mobile phone, and the location may be a coffee shop on State Street in Madison, Wis. The entity may log in with a password and request a funds transfer from a first account with a hosting financial institution to a second account with an external financial institution. For a next request, the entity may access a desktop computer in Oak Park Ill., log in with a password, and request to add a payee to a bill payment system. The entity print system 230 would record all of this information as part of an entity print record. The entity print system 230 then uses the record to generate the entity print. For each interaction, a stored entity print is compared with a generated entity print to produce an indicator of risk. This process will be further described below with reference to FIG. 3.

The interaction signature system 240 may operate to create interaction signatures based on each interaction requested by each and every interacting entity. These interactions may include, for example, transaction requests to deposit, withdraw, or transfer funds, name change requests, address change requests, password change requests, profile change requests, account closure requests, account opening requests, online bill pay actions such as adding payees, deleting payees, and making payments, requests for purchases, or any other type of request that may be initiated by an entity interacting with a financial institution. The interaction signature system may detect various similarities. For example, interactions involving two particular entities for an amount of money over a particular threshold in a particular location may be deemed as risky or as having fraudulent characteristics. Ultimately, components of the central authentication and interaction tracking system 200 may determine each interaction to be a valid interaction or a potentially fraudulent interaction based on a comparison to existing interaction signatures. This process will be further described below with relation to FIG. 4

The fraud policy system 250 may include transaction monitoring rules, policy rules, customer authentication policy, and transaction risk modeling capability. The fraud policy system 250 may be integrated with or comprise a component of the central authentication and interaction tracking system 200 or alternatively may be an entirely separate, but cooperative system. The fraud policy system 250 may define and centrally manage and store authentication policy and customer service request risk information. The fraud policy system 250 may additionally define and manage a transaction risk model, which may be continuously improved by leveraging predictive data. For example, the fraud policy system 250 may leverage information from the interaction signature system 240, which discriminates between interaction signatures for fraudulent and valid interactions. The fraud policy system 250 supports centralized, business managed policy and allows tracking, testing and deployment of criteria and rule sets. Fraud policy is adaptable on a business change cycle and may implement continuous measurement and improvement to adapt to contain evolving threats to secure customer trust. The fraud policy system 250 may respond to changes by adding new authentication credentials, modifying credential sequencing or the number of credentials required, monitoring transactions for risk patterns, and leveraging advancing technologies.

The central authentication and interaction tracking system 200 may receive policy for execution as well as the risk transaction model from the fraud policy system 250. The fraud policy system 250 may feeds its customer authentication policy to the authentication and interaction tracking system 200. Furthermore, the fraud policy system 250 may deliver its transaction risk model to the risk assessment engine 260 of the authentication and interaction tracking system 200. The fraud policy system 250 may include policy storage that is refreshed based on cumulative learning of the fraud policy system and the interaction signature system. The data may be provided to a policy storage area at regularly scheduled intervals, in real time as changes or made, or at other time or task-based intervals as may be desired. The fraud policy engine 250 may include a policy rule engine containing rule sets that declare the risk-based authentication credentials required to authenticate a customer. Within the policy rule engine, credentials may be represented as tasks so they can be swapped or sequenced (e.g., A+B or C where A=SSN, B=DOB, C=challenge questions). The policy rule engine may contain rules for multiple risk levels. For instance, all of the SSN, DOB, and challenge questions may be required to authenticate at a high risk level. A low risk authentication may require only DOB and a medium risk authentication may require two out of three of these criteria. The policy rule engine may receive data from a card SOR that records and stores customers and new card products. The policy rule engine may operate in a manner similar to that disclosed in U.S. Pat. No. 7,058,817, which is hereby incorporated by reference.

The risk assessment system 260 also receives data through the applications 50 regardless of the access channel. The risk assessment engine 260 further receives information from the fraud policy system 250 so that it can deploy a transaction risk model after validation and completion of the business change management process. The deployment of the transaction risk model enables transparent calculation of a risk assessment. The risk assessment system 260 supports centralized capture of risk prioritized customer interactions across all channels, enabling interaction risk assessment. As set forth above, the risk assessment may influence the authentication policy presented. The risk assessment engine 260 further records customer interactions transmitted from applications 50 that have been determined to be fraud to be predictive of risky behavior. The risk assessment engine 260 may perform in a real time mode or batch transaction mode. The risk level influences the level or tier of the authentication policy required. In operation, the risk assessment engine 260 may consider native connection data or degree of risk associated with each channel of FIG. 1. The risk assessment system 260 may be business configurable and should support risk models and complex interaction processing rule sets.

The customer profile 236 supports capture of previous customer authentications including point of interaction, time, initial servicing request and outcomes to enable risk assessment. While the entity print system 230 is designed to store historical data for all interacting entities, the customer profile 236 is designed to store customer data, which typically is submitted by the customer to the financial institution. The customer profile 236 may include customer security data such as voiceprint data, fingerprint data, and iris pattern data. The customer profile 236 may additionally include knowledge factors such as password, PIN, proprietary & public record content, and credit bureau data. The customer profile 236 may serve as the SOR for customer activity and action views as well as customer strategy. Generally speaking, the customer profile 236 may include a customer account profile and a customer activity record, both of which may be updated continuously or at regularly scheduled intervals. The customer profile 236 may include a configurable activity window which captures customer interactions that may be predictive of fraud as determined by the fraud policy system 260. The customer profile 236 may also serve as a source of information for the authentication and interaction tracking system in combination with the entity print system. The customer profile 236 stores personal information submitted by the customer to the financial institution. In contrast, the entity print system records activity and develops an entity print without regard for the stored information. For authentication purposes, both the customer profile 236 and the entity print system 230 can contribute information for use by the authentication engine.

Figure 3:
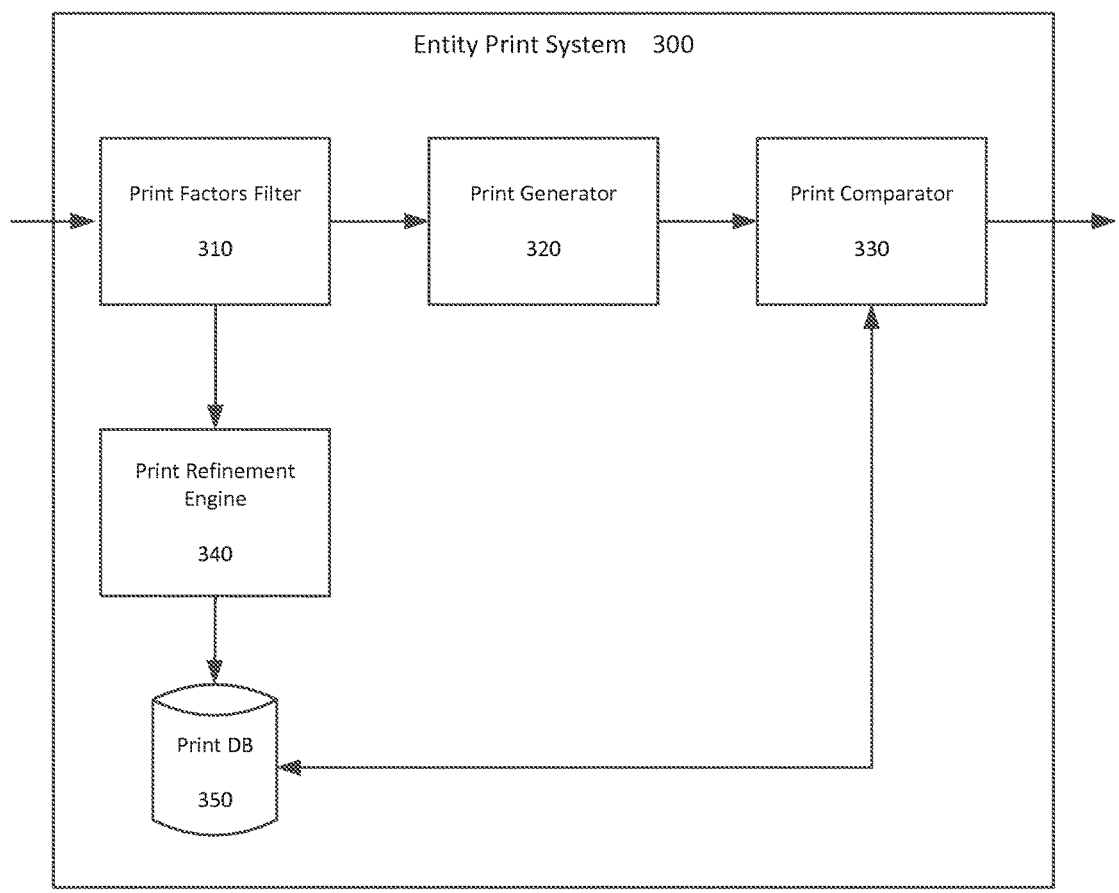
FIG. 3 is a block diagram illustrating an entity print system in accordance with an embodiment of the invention.

FIG. 3 is a block diagram illustrating an entity print system 300 in accordance with an embodiment of the invention. The entity print system 300 may include a print factors filter 310, a print generator 330, a print comparator 330, a print refinement engine 340 and a print database 350. In operation, the print factors filter 310 may receive the transaction request and extract factors from the transaction request that may become part of an entity print record. The factors may include, for example, password, security questions, biometric authentication factors, IP address, device identifier, geo-location, transaction type, date, and time. The print generator 320 may initially take these factors to generate an entity print, which may be refined over time by the print refinement engine 340. The entity print records and current entity print may be stored the print database 350. While the entity print record may include every detail of historical interaction with the entity, the derived entity print may be a summation, average, or index representative of all the recorded interactions with the entity. For any incoming interaction request, the print comparator 330 may compare a generated entity print for the interaction with a stored print for the entity to determine a degree of correspondence. The entity print system 300 may pass the entity print, including an identifier indicative of the degree of correspondence and a risk measure indicative of the level of risk associated with the entity back to the authentication engine 220, which may use this measure along with information from the fraud policy system 250 and the risk assessment system 260 (from FIG. 2) to further conduct an authentication determination.

While in some embodiments of the invention, the actual factors received by the entity print system 300 may be stored as part of the entity print, other embodiments may address privacy concerns by storing parameters indicative of a comparison rather than the actual factors themselves. For example, the system may perform a triangulation process to compare received parameters with two existing reference entity prints and may store the new entity print record as a distance from the reference entity print records. The triangulation process used may be similar to that disclosed in U.S. Pat. No. 3,248,734, the disclosure of which is incorporated herein by reference. The entity print generator 230 then generates an index or average based on the triangulated print record.

In embodiments of the invention, both a unique standardized reference entity print and an individualized entity print are stored. In this instance, parameters of a requested interaction may be compared to both the individualized entity print and to the standardized reference entity print through the triangulation process. In alternative embodiments, the received factors may be compared with multiple unique standardized reference prints.

In instances where an interaction request does not result in authentication of the requesting entity, the interaction request may be tagged accordingly in the record. Of course not all refusals to authenticate indicate that the activity is fraudulent.

Thus, through the entity print system 300, a historical print for each entity transacting with a financial institution is developed over time. Based on the entity prints, the comparator dynamically generates an indicator of risk of fraud by comparing the entity print for the requested interaction with the historical entity print. The evolving print accounts for such contingencies as lost cell phones and devices, changing travel patterns and a change of location due to a change of job or a move.

Figure 4:
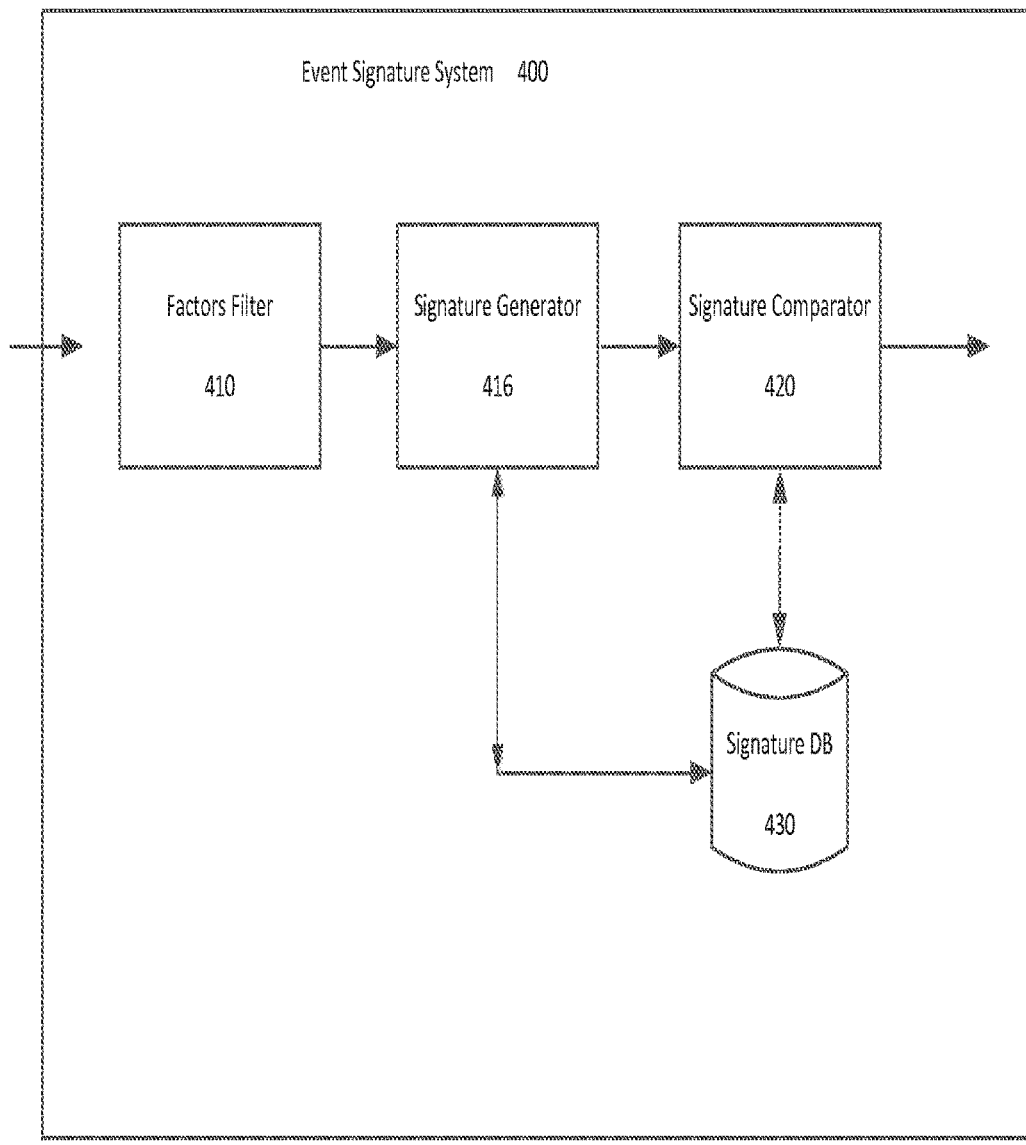
FIG. 4 is a block diagram illustrating an interaction signature system in accordance with an embodiment of the invention.

FIG. 4 is a block diagram illustrating an interaction signature system 400 in accordance with an embodiment of the invention. The interaction signature system 400 may include a factors filter 410, a signature generator 416, a signature database 430 and a signature comparator 420 for comparing received interaction signatures with stored interaction signatures. Interaction signatures may be created for every interaction taking place with the financial institution. The factors filter 410 may receive authentication factors as well as details of the interaction request and forward the factors and other details in an organized format to the signature generator 416. In preferred embodiments of the invention, the factors filter 410 is able to filter the interaction request for all factors of historical relevance. The factors may include for example, such factors as date, time of day, day of the week location, amount when money is involved, other parties to the interaction, number of parties involved in the interaction, size of parties involved in the interaction, relationship of other parties with the requester, identity of accounts, access method, identity of devices, nature of interaction, what authentication method was utilized, authentication methods passed, authentication methods failed, fingerprint submitted, password entered, and any other relevant factors. In embodiment of the invention, related external activities may also be linked, such as social media postings and status, social media connection between entities involved, weather, and other external factors. These may be the same factors as considered by the entity print system but may also include different or additional factors. The signature generator 416 may create an interaction signature from these factors. The factors filter 410 may also receive feedback from the authentication engine for each interaction to indicate whether the interaction was considered to be a valid interaction or a fraudulent interaction and pass this information to the signature generator 416. The signature generator 416 may store interaction signatures for fraudulent interactions with fraudulent tags. Incoming interaction signatures may be compared to these fraudulent interaction signatures by the signature comparator 420 in order to determine their degree of correspondence to the historically fraudulent even signatures. Thus, through the interaction signature system 400, the overall characteristics of the interaction are evaluated for correspondence to previous fraudulent interactions. If the current interaction includes characteristics with a high degree of correspondence to a previous fraudulent interaction, the signature comparator 420 may send a notification to the authentication engine for evaluation.

Figure 5:
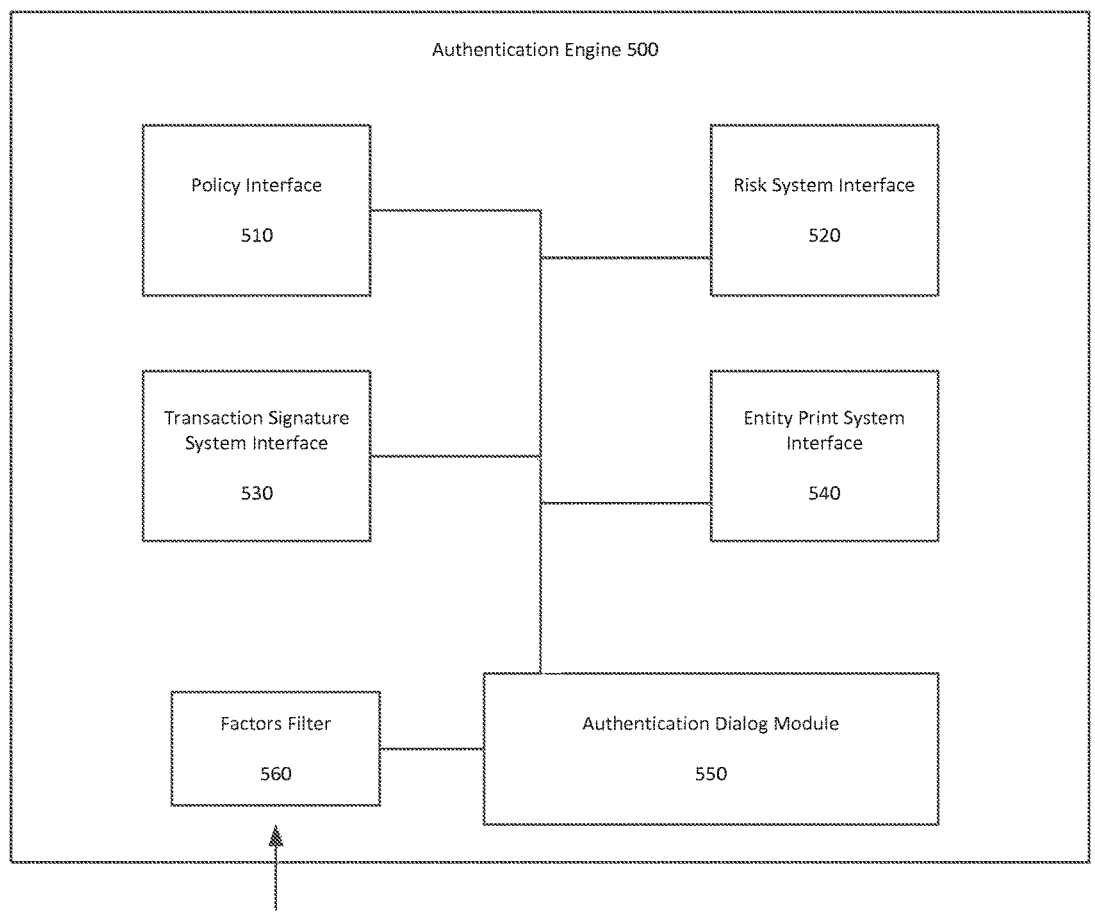
FIG. 5 is a block diagram illustrating an authentication engine in accordance with an embodiment of the invention.

FIG. 5 illustrates details of an authentication engine 500. The authentication engine 500 may include policy interface 510, a risk assessment interface 520, an interaction signature system interface 530, and entity print system interface 540, an authentication dialog module 550, and an authentication factors filter 560. Through the authentication dialog module 550, the authentication engine 500 interacts with the applications, the interaction signatures system, the entity print system, the policy rule system, and the risk assessment engine to make an appropriate authentication determination. Through the policy interface 510, based on information obtained from the application interface and the risk assessment interface 520 as well as the transaction signature interface 530 and the entity print system interface 540, the authentication dialog module 550 may determine whether the user has been authenticated to a level appropriate for the requested interaction. In this instance, if a customer request requires a high authentication level, the authentication engine 500 may request additional authentication credentials from the application level authentication tools. In embodiments of the invention, if the authentication level approved is only for the requested interaction, subsequent requests that require more security and thus a higher authorization level will require additional credentials to be presented.

In other embodiments, the authentication engine 500 may determine based on application level indicators that a customer is sufficiently authenticated and is free to interact through the channel. Thus, the customer is sufficiently authenticated to perform any and all transactions. While this embodiment would generally require a high level of authentication, it may be more efficient in instances in which a customer has multiple requests that may generate differing risk levels and thus a series of separate authentications.

After initial analysis of data from the application level, the authentication dialog module 550 may determine based on feedback from connected systems such as the entity print system, interaction signature system, and policy and risk assessment systems, that additional authentication is required before allowing a customer to perform a requested transaction. In this instance, the authentication engine 550 will request that further information be retrieved from the customer at the application level. Upon receipt of the additional information, the authentication engine 500 may again conduct an authentication dialog in order to authenticate the customer. In embodiments of the invention, the components may operate interactively to create an adaptive system capable of learning from past behaviors. Risk levels associated with the aforementioned factors may be adjusted in accordance with actual risk determined over time through feedback into the system.

Figure 6:
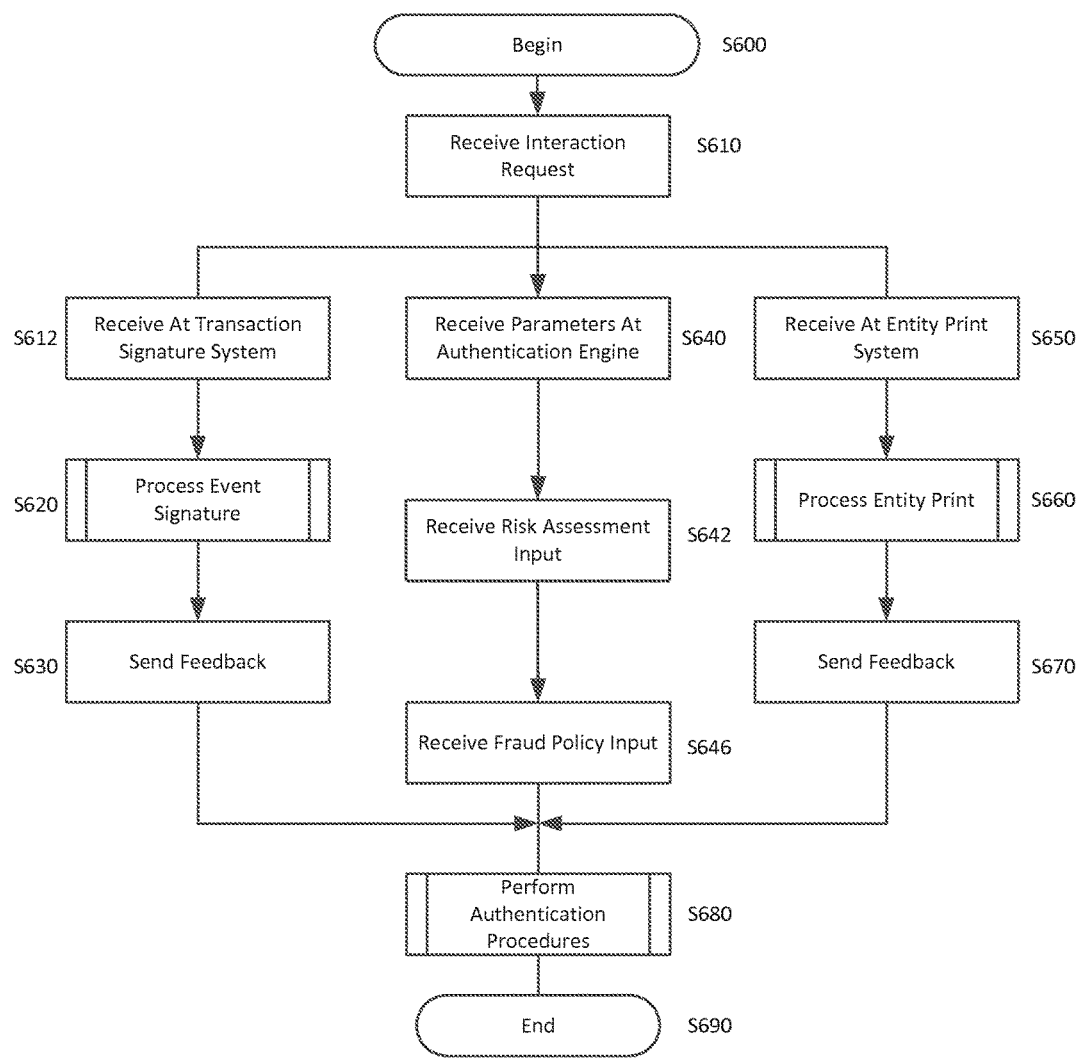
FIG. 6 is a flow chart illustrating an authentication process in accordance with an embodiment of the invention.

FIG. 6 is a flow chart illustrating an authentication process in accordance with an embodiment of the invention. The method begins in S600 and the authentication and interaction tracking system receives an interaction request in S610. The interaction request may embark on parallel processing routes, such that the entity print system, the authentication engine, and the interaction signature system receive the interaction request in S612, S640, and S650. When the interaction request is received at the interaction signature system in S612, the interaction signature system processes the interaction signature in S620 and sends feedback to the authentication engine in S630. The feedback may be indicative of the likelihood that the interaction is fraudulent or that the interaction is valid based on a historical interaction comparison. The processing of the interaction signature in S620 will be further described below with reference to FIG. 8. The feedback provided in S630 may include a likelihood that the requested interaction is a fraudulent interaction.

In parallel, the entity print system may receive the interaction request at S650 and process the entity print in S660. The processing of the entity print is further described below with respect to FIG. 7. The entity print system may send its feedback to the authentication engine in S670. The feedback may indicate a degree of correspondence between the current entity print and the stored entity print.

Also in parallel, the authentication engine may receive the parameters of the transaction request in S640. The authentication engine may further receive input from the risk assessment system at S642 and input from the fraud policy system at S646. In S680, based on all of the input from the entity print system, interaction signature system, fraud policy system and risk assessment system, the authentication engine may perform authentication procedures in S680. The authentication procedures are further described below with respect to FIGS. 9 and 10. Although the procedures of the various systems are disclosed herein as occurring in parallel, this may not necessarily be the case. For example, the entity print system may provide conclusive feedback and in this case it may not be necessary to consider feedback from the interaction signature system.

Figure 7:
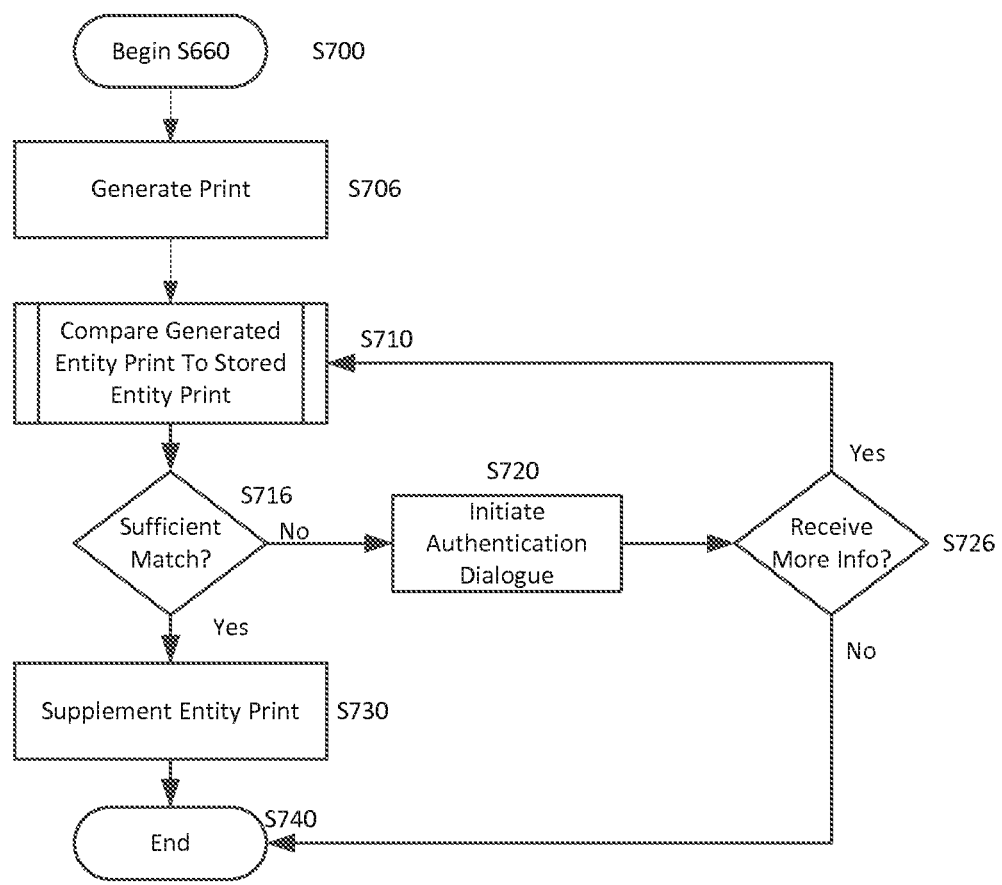
FIG. 7 is a flow chart illustrating a process of creating an entity print in accordance with an embodiment of the invention.
Figure 8:
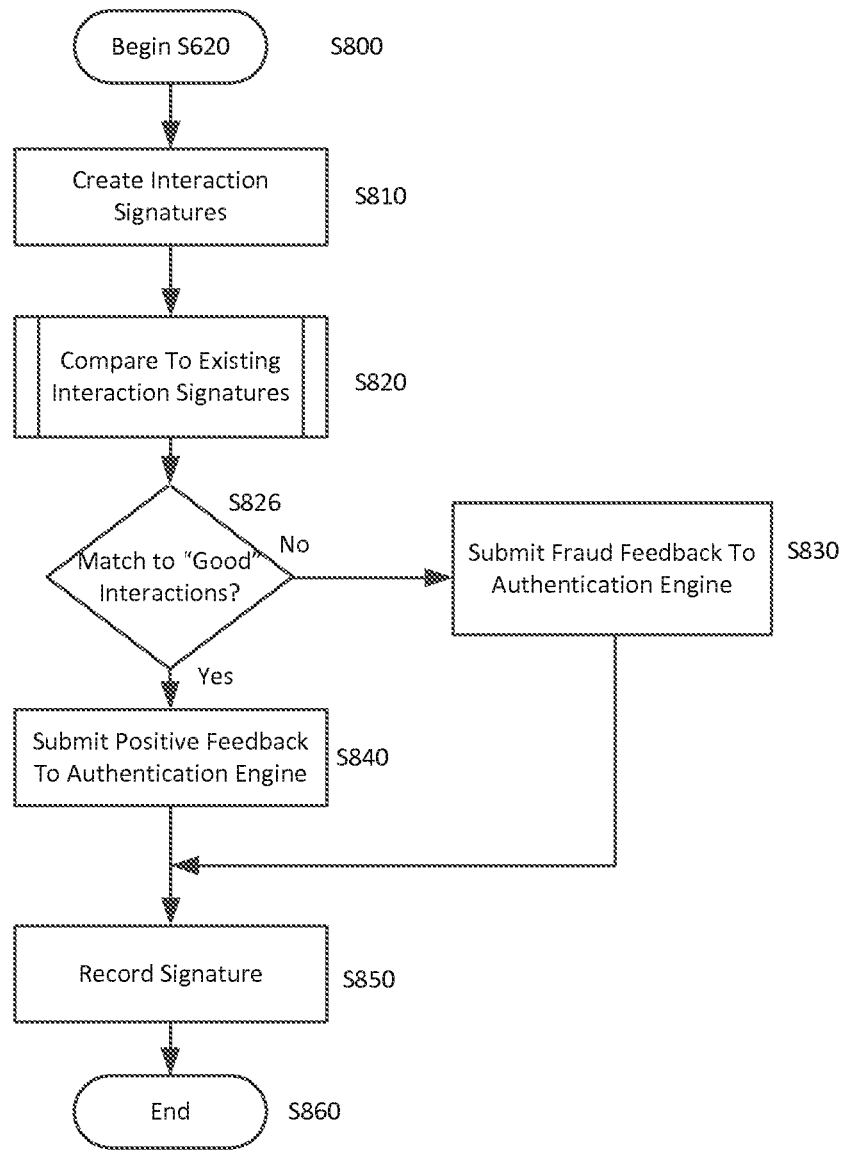
FIG. 8 is a flow chart illustrating a method for processing interaction signatures in accordance with an embodiment of the invention.

FIG. 7 is a flow chart illustrating a method for processing an entity print in accordance with S660 of FIG. 6. The method begins in S700 in accordance with an embodiment of the invention. The entity print system receives the factors forwarded through the application interface, derives the entity print in S706 from the received factors, and compares it in S710 to the stored entity print. The factors may include for example, such factors as date, time of day, day of the week location, amount when money is involved, other parties to the interaction, number of parties involved in the interaction, size of parties involved in the interaction, relationship of other parties with the requestor, identity of accounts, access method, identity of devices, nature of interaction, what authentication method was utilized, authentication methods passed, authentication methods failed, fingerprint submitted, password entered, and any other relevant factors. As set forth above, the derivation of the entity print may include calculation of an identity indicator indicative of the identity of the requesting entity as well as a risk indicator indicative of the risk of the requesting entity. These indicators may be expressed as numbers on a scale, percentages, or in any other utilitarian manner. The comparison may be made through any one of a number of methods known in the art. The entity print system may evaluate the results of the comparison to determine if the match is sufficient in S716. The threshold for sufficiency may be multidimensional or may simply include a maximum deviation from a pre-selected print identified by a number or index. If the match is sufficient in S716, the entity print system may supplement the entity print in S730 prior to providing positive feedback to the authentication engine. The updated entity print is stored in the entity print database for future comparisons. In this manner, the entity print evolves over time, such that it evolves as an entity's habits and routines evolve over time. If the match is not sufficient in S716, the system may initiate an authentication dialogue with the authentication engine in S720 and may receive further feedback in S726. If the entity print system does not receive additional feedback from the authentication engine in S726, it may end the process and provide negative feedback by indicating to the authentication and interaction tracking system that the entity print was an insufficient match. However, if the entity print system does receive additional feedback in S726, it may perform the comparison again at S710. The method ends in S740, FIG. 8 is a flow chart illustrating a method for processing interaction signatures in accordance with S620 of FIG. 6. The method begins in S800 and the interaction signature system creates an interaction signature in S810. In S820, the interaction signature system compares the generated interaction signature to existing interaction signatures. In embodiments of the invention, the current generated interaction signature is compared to past interaction signatures that were deemed fraudulent. Based on this comparison, the interaction signature system may return negative feedback to the authentication engine. In alternative embodiments, the current interaction signature may be compared with interaction signatures deemed valid in S826. If an insufficient match is found, the system may submit feedback indicating likelihood of fraud to the authentication engine in S830. If a sufficient match is found, the interaction signature system may submit positive feedback to the authentication engine in S840. The interaction signature is recorded in S850 and may be marked as either a fraudulent interaction or a valid interaction. The method ends in S860.

Figure 9:
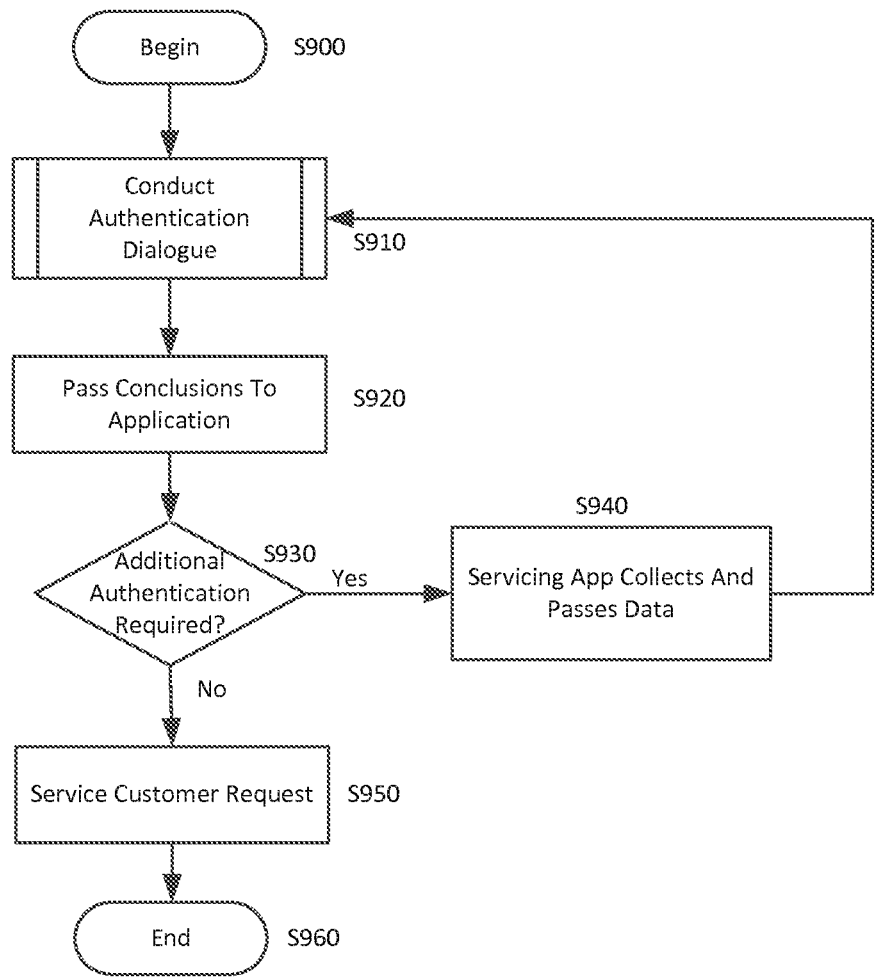
FIG. 9 is a flow chart illustrating performance of authentication procedures in accordance with an embodiment of the invention.

FIG. 9 is a flow chart illustrating performance of authentication procedures in accordance with an embodiment of the invention. The process begins in S900 and the authentication engine conducts the authentication dialogue in S910. After the authentication dialog, the authentication engine passes its conclusion from the authentication dialogue to the application in S920. In S930, if additional authentication is required, the servicing application collects and passes the authentication data back to the authentication engine in S940. The authentication and interaction tracking system would then again perform the appropriate dialogue. However, if no additional authentication is required in S930, the system services the customer request in S950. The process ends in S960.

Figure 10:
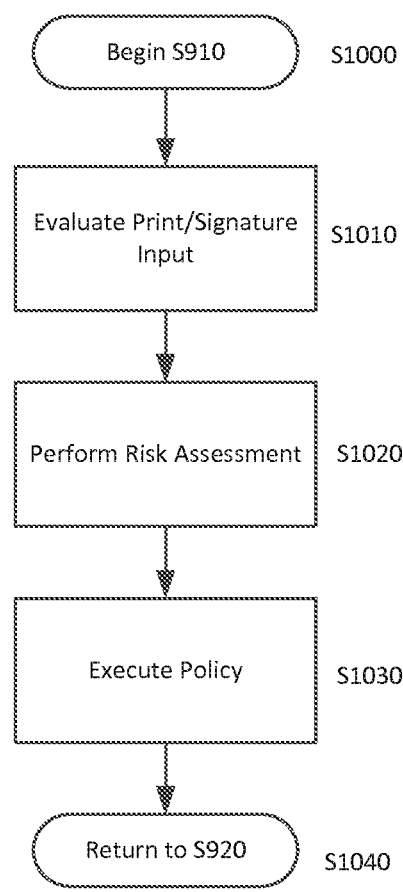
FIG. 10 is a flow chart illustrating an authentication dialogue in accordance with an embodiment of the invention.

FIG. 10 is a flow chart illustrating an authentication dialogue in accordance with an embodiment of the invention. The method for performing the authentication dialog begins in S1000. The authentication engine evaluates the print/signature input in S1010. The authentication engine evaluates risk assessment input, which may include data and/or conclusions, from the risk assessment system in S1020 and executes provided policy rule sets in S1030 to determine whether, based on existing information, a customer can be authenticated and/or by determining what additional information is necessary in order to authenticate the requestor. In S1040, the system returns to S920 to pass its conclusions to the application. The conclusion may be one of multiple conclusions including "entity authenticated", "more information required", and "entity not authenticated". If the system fails to authenticate the entity, it may allow additional tries or require the entity to access the system through an alternative channel.

Some practical examples are provided herein in order to illustrate the operation of the methods described in connection with FIGS. 6-10. For example, Mary Stanley may initiate interaction with a Card Customer Service (CMS) application and enter through an automated voice recognition unit (VRU). The CMS application may prompt Mary for information such as an account number. The VRU may interact with a voice authentication service at the application level, passing the account identifier. The voice authentication service at the application level determines if the Mary's voice print is on file. If the voiceprint is on file, the VRU prompts the customer to speak, and determines a confidence level, for example a 98% confidence level. The voice authentication service then contacts the authentication and interaction tracking system as described herein, and passes the account number, phone number (ANI), customer requested action, and voice confidence level. The application preferably also passes additional details such as the nature of the interaction request, the date, time, day of the week, location (which may be a GPS determined location), other parties involved in the interaction, the size of the parties involved in the interaction, the relationship between the parties involved, the access method, and any related external activities. All of this information is passed from the application to the central authentication such that the entity print system and interaction signature systems can process the information and the authentication engine can receive the processed information and conduct an authentication dialog.

As illustrated in FIG. 10, to conduct the authentication dialog, the authentication may perform a risk transaction assessment by gathering data from the customer profile, the entity print system, the interaction signature system, and the risk assessment system. The entity print system preferably provides an indicator of identity correspondence and an indicator of identity risk. For example, the entity print system may provide an indicator that it is 98% confident that the requester is indeed Mary Stanley. The entity print system may also generate an indicator that Mary Stanley is not a risky entity as her risk level is only 3%. While percentages are used in this example, the entity print system could generate other forms of entity prints. With respect to the interaction signature system, the system may generate an indicator of the likelihood the requested transaction is fraudulent given the parameters transmitted from the application. In this instance, the interaction signature system may determine there is less than a 1% chance that the transaction is fraudulent based on the interaction details.

With respect to the customer profile, the profile may provide additional information that can be evaluated by the authentication engine. For example, the customer profile may provide information regarding recent activity occurring within a set time period. This information may include frequency of phone calls representing this account in a recent time period, frequency of phone calls from this ANI, occurrence of non-monetary change activity on this account, i.e. address/phone/email address/password, occurrence of unusual or large monetary activity on this account, or number of days since voiceprint enrollment. Other information relevant to the transaction risk assessment may be gathered from such sources as an organization website. This information may include customer enrollment history, length of enrollment, frequency of "hits" to site on this customer record in a recent time period, and what transactions have been performed on the web. The website information may also include information on the access device and its location and a determination of whether credentials for login have changed in a recent time period. In addition to the customer profile, additional sources may also be implemented to provide information to the risk scoring or assessment engine. These sources may include, for example, industry partners that may have information relevant to the customers. Furthermore, factors such as the type of customer request, such as whether the request is a balance inquiry, a balance transfer, or a withdrawal may impact an assessed risk level. The channel through which the customer interacts may also impact the assessed risk level. In embodiments of the invention, the nature of the interaction between the authentication engine and the customer profile may be limited when the interaction signature system and entity print system produce definitive results.

Other data gathered from the customer profile may include data from other lines of business within the organization. For example, if user is a credit card customer, the data may include mortgage data and banking data. The data may also include determination of recent fraud-related account status and of the account number or caller's phone number on any negative file. Additional data may also be included as appropriate.

The authentication engine may request and receive policy from the policy rule engine and execute the policy rules sets in S1030, in this example, the authentication engine finds no attribute or condition from above that meets high-risk threshold singularly or in combination with other attributes. Absent other high risk attributes, the voice confidence of 98% meets a threshold as determined by the policy rule engine for the caller to transact anywhere in the "enterprise" without limitation. The authentication engine logs this outcome and passes it back to the VRU at the application level, which informs the caller he/she has been authenticated.

In preferred embodiments, the total time elapsed for this process is about one second, but may be less than one second or may be several seconds. Should caller request to speak to a representative, the authentication entitlement may be passed from the VRU to the representative's desktop with no additional authentication.

In an alternative scenario, the voice authentication service at the application level may return a confidence level of 63% to the VRU. The VRU operates as described above by passing providing the confidence score and other information to the authentication and interaction tracking system.

Again, the authentication engine conducts the authentication dialog by gathering information from internal sources as described above for analysis. In this example, the authentication engine finds no attribute or condition from above that meets high-risk threshold singularly or in combination with other attributes. However, with the voice confidence level of 63%, the authentication engine determines through execution of policy rule sets in S1030 that additional authentication is necessary. In this example, the account is a credit card/airline frequent flier partnership. The authentication engine therefore sends instructions to the VRU to prompt the caller for his/her frequent flier member number or current "miles" balance in thousands of miles as additional authentication. The caller complies by entering the frequent flier member number and, the VRU passes this data to the authentication and interaction tracking system, which validates the data and returns instructions to the VRU to allow the caller to transact without restriction.

In yet a third scenario, the voice service determines that the customer voiceprint is not enrolled and returns this information to the VRU. The VRU automatically contacts the authentication engine providing information such as the caller's account number, phone number (ANI), and "not enrolled" voice status. As set forth above, the authentication engine gathers data from internal sources to make a risk assessment and implements the policy rule engine. The entity print system has very little information regarding the customer and provides feedback indicating only a 50% confidence level that this customer is actually the requestor and can provide no information on whether the customer is a risky entity. The interaction signature system provides feedback that there is a 5% chance that the interaction is fraudulent. In this example, the authentication engine seeks further information from the customer profile and finds that the home phone number on this account was changed three days ago via an Internet channel, further that the device used in that Internet session had not been used by the customer before then since enrolling in sixty days earlier. However, the authentication requirement in that Internet session was met and no other recent activity is identified by the authentication engine. On the risk level created by this data, based on the policy rule sets, the authentication engine determines it cannot offer voice service enrollment or allow account access to the caller without incremental authentication. Thus it instructs the VRU to prompt the caller to speak the name of the bank from which a payment was made to the account about twenty five days ago. The caller complies and the VRU passes the textual outcome of the caller's utterance back to the authentication engine. The authentication engine compares the text to a database record of the bank name, confirms a match, and instructs the VRU to allow the caller to transact without restriction but to also offer voice service enrollment prior to proceeding.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

Although many other internal components of the computer are not shown, those of ordinary skill in the art will appreciate that such components and the interconnections are well known. Accordingly, additional details concerning the internal construction of the computer need not be disclosed in connection with the present invention These examples are merely illustrative and embodiments of the authentication and interaction tracking system described herein may be implemented to execute a myriad of authentication interactions. While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A method for facilitating authentication of entities engaging in transactions, the authentication based on a record of interactions initiated by the entities, the method comprising:
    receiving interaction requests from a requesting entity over a network including at least one computer memory and at least one computer processor;
    generating, from each interaction request, an entity print and interaction signature;
    classifying each interaction signature as at least one of a valid interaction signature or a fraudulent interaction signature;
    generating, based at least on a comparison, a confidence level that a requesting entity is authentic and a risk level associated with authenticity of the interaction request, wherein the comparison involving at least the interaction signature, the entity print and historical signatures;
    determining whether the risk level and confidence level meet requirements for authentication;
    providing feedback to an authentication engine based on the risk level and confidence level; and
    executing policy rule sets at the authentication engine to reach an authentication conclusion, the conclusion including one of a requirement for more information, a positive authentication decision, and a negative authentication decision,
    wherein the determining includes risk assessment of whether the risk level and the confidence level satisfy a risk threshold for determining liability of the interaction request,
    wherein the entity print refers to historical transactions with of the user, and
    wherein the interaction signature refers to historical non-payment type transactions conducted by the user.

2. The method of claim 1, wherein the interaction requests originating from at least one user device, wherein the user device supports multiple diverse applications that include origination applications, transaction applications, and servicing applications.

3. The method of claim 1, further comprising modifying the historical entity print after each interaction for each of the multiple entities, such that the historical entity print is representative of all recorded interactions over time with each of the multiple entities.

4. The method of claim 1, further comprising building from each interaction request, an interaction signature for each interaction and classifying each interaction signature as a valid interaction signature or a fraudulent interaction signature.

5. The method of claim 1, further comprising comparing the received authentication factors for a requested interaction with the entity print and comparing the interaction signature for a received interaction request with the classified interaction signatures,
    wherein the comparisons yield a level of risk for each transaction.

6. The method of claim 1, wherein the device identifiers include an IP address.

7. The method of claim 1, wherein the personal identifier includes at least one of an RSID and a biometric indicator.

8. The method of claim 1, wherein the geographical transaction features are determined by geolocation.

9. The method of claim 1, wherein the authentication methods utilized include at least one of passwords, security questions, and biometric authentication factors.

10. The method of claim 1, wherein the authentication engine receives input from multiple interconnected systems including an entity print system, an interaction signature system, and a policy and risk assessment system in order to make an authentication determination.

11. A central authentication and interaction tracking system for facilitating authentication of entities engaging in transactions, the authentication based on a record of interactions initiated by the entities, the system comprising:
    an application interface for receiving interaction requests from a requesting entity over a network;
    at least one computer memory storing information from the interaction requests and instructions for processing the information; and
    at least one computer processor accessing the computer memory and executing the stored instructions in the computer memory to perform:
        receiving interaction requests from a requesting entity over a network including at least one computer memory and at least one computer processor;
        generating, from each interaction request, an entity print and interaction signature;
        classifying each interaction signature as at least one of a valid interaction signature or a fraudulent interaction signature;
        generating, based at least on a comparison, a confidence level that a requesting entity is authentic and a risk level associated with authenticity of the interaction request, wherein the comparison involving at least the interaction signature, the entity print and historical signatures;
        determining whether the risk level and confidence level meet requirements for authentication according to at least one policy;
        providing feedback to an authentication engine based on the risk level and confidence level; and
        executing policy rule sets to reach an authentication conclusion, the conclusion including one of a requirement for more information, a positive authentication decision, and a negative authentication decision,
        wherein the determining includes risk assessment of whether the risk level and the confidence level satisfy a risk threshold for determining liability of the interaction request,
        wherein the entity print refers to historical transactions with of the user, and
        wherein the interaction signature refers to historical non-payment type transactions conducted by the user.

12. The system of claim 11, wherein the interaction requests originating from at least one user device, wherein the user device supports origination applications, transaction applications, and servicing applications.

13. The system of claim 11, wherein the computer processor further performs the modifying the historical entity print after each interaction for each of the multiple entities, such that the historical entity print is representative of all recorded interactions over time with each of the multiple entities.

14. The system of claim 11, wherein the computer processor further performs the building from each interaction request, an interaction signature for each interaction and classifying each interaction signature as a valid interaction signature or a fraudulent interaction signature.

15. The system of claim 11, wherein the computer processor further performs comparing the received authentication factors for a requested interaction with the entity print and comparing the interaction signature for a received interaction request with the classified interaction signatures, wherein the comparisons yield a level of risk for each transaction.

16. The system of claim 11, wherein the device identifiers include an IP address.

17. The system of claim 11, wherein the personal identifier includes at least one of an RSID and a biometric indicator.

18. The system of claim 11, wherein the geographical transaction features are determined by geolocation.

19. The system of claim 11, wherein the authentication methods utilized include at least one of passwords, security questions, and biometric authentication factors.

20. The system of claim 11, wherein the authentication engine receives input from multiple interconnected systems including an entity print system, an interaction signature system, and a policy and risk assessment system in order to make an authentication determination.

21. A non-transitory computer readable storing instructions for facilitating authentication of entities engaging in transactions, the authentication based on a record of interactions initiated by the entities, the instructions executed by a computer processor to perform:
receiving interaction requests from a requesting entity over a network;
generating, from each interaction request, an entity print and interaction signature;
classifying each interaction signature as at least one of a valid interaction signature or a fraudulent interaction signature;
generating, based at least on a comparison, a confidence level that a requesting entity is authentic and a risk level associated with authenticity of the interaction request, wherein the comparison involving at least the interaction signature, the entity print and historical signatures;
determining whether the risk level and confidence level meet requirements for authentication according to at least one policy;
providing feedback to an authentication engine based on the risk level and confidence level; and
executing policy rule sets to reach an authentication conclusion, the conclusion including one of a requirement for more information, a positive authentication decision, and a negative authentication decision,
wherein the determining includes risk assessment of whether the risk level and the confidence level satisfy a risk threshold for determining liability of the interaction request,
wherein the entity print refers to historical transactions with of the user, and
wherein the interaction signature refers to historical non-payment type transactions conducted by the user.

22. A method for facilitating authentication of entities engaging in transactions, the method comprising:
transmitting, from a computer device, an interaction request over a network to a computer system for receiving interaction requests, the interaction request causes at least one processor of a security system to perform at least the following:
generating, from the interaction request, an entity print and interaction signature;
classifying each interaction signature as at least one of a valid interaction signature or a fraudulent interaction signature;
generating, based at least on a comparison, a confidence level that a computer device is authentic and a risk level associated with authenticity of the interaction request, wherein the comparison involving at least the interaction signature, the entity print and historical signatures;
determining whether the risk level and confidence level meet requirements for authentication according to at least one policy;
providing feedback to an authentication engine based on the risk level and confidence level; and
executing policy rule sets to reach an authentication conclusion, the conclusion including one of a requirement for more information, a positive authentication decision, and a negative authentication decision,
wherein the determining includes risk assessment of whether the risk level and the confidence level satisfy a risk threshold for determining liability of the interaction request,
wherein the entity print refers to historical transactions with of the user, and
wherein the interaction signature refers to historical non-payment type transactions conducted by the user.

23. An interaction processing system comprising:
a plurality of receivers configured to receive, via different communication channels, interaction requests from a requesting entity over a network;
at least one computer memory including executable instructions, the executable instructions including at least a plurality of applications for processing interaction requests; and
at least one computer processor accessing the computer memory and executing the stored instructions, said execution instructions causing at least the following:
receiving an interaction request over at least one channel of the plurality of communication channels;
communicating an authentication request to an authentication system, the authentication request causing at least one processor of the authentication to perform at least the following: generating, based on the interaction request, an entity print and interaction signature;
classifying each interaction signature as at least one of a valid interaction signature or a fraudulent interaction signature;
generating, based at least on a comparison, a confidence level that a requesting entity is authentic and a risk level associated with authenticity of the interaction request, wherein the comparison involving at least the interaction signature, the entity print and historical signatures;
determining whether the risk level and confidence level meet requirements for authentication according to at least one policy;

providing feedback to an authentication engine based on the risk level and confidence level; and executing policy rule sets to reach an authentication conclusion, the conclusion including one of a requirement for more information, a positive authentication decision, and a negative authentication decision, wherein the determining includes risk assessment of whether the risk level and the confidence level satisfy a risk threshold for determining liability of the interaction request, wherein the entity print refers to historical transactions with of the user, and wherein the interaction signature refers to historical non-payment type transactions conducted by the user.

* * * * *